United States Patent [19]

Ohga et al.

[11] Patent Number: 5,763,081
[45] Date of Patent: Jun. 9, 1998

[54] GLASS BODY FOR OPTICAL FIBER METHOD OF SELECTING THE SAME OPTICAL FIBER AND METHOD OF MAKING THEREOF

[75] Inventors: Yuichi Ohga; Shinji Ishikawa; Tadashi Enomoto, all of Yokohama, Japan

[73] Assignee: Sumitomo Electric Industries, Ltd., Osaka, Japan

[21] Appl. No.: 738,841

[22] Filed: Oct. 28, 1996

[30] Foreign Application Priority Data

Nov. 9, 1995 [JP] Japan .................................. 7-316043

[51] Int. Cl.$^6$ .................. B32B 9/00; G02B 6/02; B29D 11/00
[52] U.S. Cl. .................. 428/392; 428/375; 428/391; 385/124; 385/142; 264/1.24; 264/1.29; 264/1.6; 65/397; 65/398; 65/401; 65/424; 65/435
[58] Field of Search ..................... 385/142, 124; 65/397, 398, 399, 424, 423, 435, 32.1; 428/392, 391, 364; 264/1.1, 1.24, 1.29, 1.6

[56] References Cited

U.S. PATENT DOCUMENTS 5,059,229  10/1991  Blankenship et al. .

FOREIGN PATENT DOCUMENTS 0 164 127  12/1985  European Pat. Off. .
0 171 537   2/1986  European Pat. Off. .
0 495 605   7/1992  European Pat. Off. .
4-260634    9/1992  Japan .

OTHER PUBLICATIONS

Hosono et al, "Preferred Concentration Enhancement of Photobleachable Defects Responsible for 5eV Optical Absorption Band in SiO$_2$:GeO$_2$ Glass Preform by Heating in a H$_2$ Atmosphere". Appl Phys. Lett., vol. 63, No. 4, Jul. 26, 1993, pp. 479–481.

Hosono et al, Nature and Origin of the 5–eV Band in SiO$_2$:GeO$_2$ Glasses, Physical Review B, vol. 46, No. 18, Nov. 1992, pp. 445–451.

Gur'yanov et al, "Radial Distribution of Impurity Defects in Blanks for Fiber Light Guides Based on Vitreous Silica Plus Geranium Dioxide", Fizika I Khimiya Stekla, May–Jun. 1986, USSR, vol. 12, No. 3, Jun. 1986, pp. 200–204.

Tsai et al, "Structural Origin of the 5.16 eV Optical Absorption Band in Silica and Ge–Doped Silica", Appl Phys. Lett., vol. 64, No. 12, Mar. 21, 1994, pp. 1481–1483.

Susa et al, "Sol–gel Derived Ge–Doped Silica Glass for Optical Fiber Application II. Excess Optical Loss", Journal of Non–Crystalline Solids, vol. 128, No. 2, Apr. 1, 1991, pp. 118–125.

Physical Review B, vol. 46, No. 18, Nov. 1, 1992–II, Nature and origin of the 5–eV band in SiO2:O2 glasses, H. Hosono et al pp. 11 445–11 451.

Primary Examiner—Marion E. McCamish
Assistant Examiner—J. M. Gray
Attorney, Agent, or Firm—Cushman Darby & Cushman IP Group of Pillsbury Madison & Sutro LLP

[57] ABSTRACT

A glass body for optical fiber containing GeO$_2$—SiO$_2$ glass in a core portion thereof, in which the GeO$_2$—SiO$_2$ glass has an absorbance at 5.16 eV of at least 1/mm but not higher than 2.5/mm or in which concentration of Ge$^{2+}$ contained in the GeO$_2$—SiO$_2$ glass substantially lies within the range of $1.1 \times 10^{-5}$ to $2.8 \times 10^{-9}$ mol/mm$^3$ as calculated by the following general equation:

$$A = \epsilon_{5.16ev} \cdot C_{(Ge2+)} \cdot 1$$

wherein A is absorbance which is expressed by $A = -\log T$ (T being transmittance) and normalized per 1 mm of optical path length, $C_{(Ge2+)}$ is Ge$^{2+}$ concentration, $\epsilon_{5.16ev}$ is absorption coefficient (1/mol/cm), and 1 is optical path length.

9 Claims, 5 Drawing Sheets

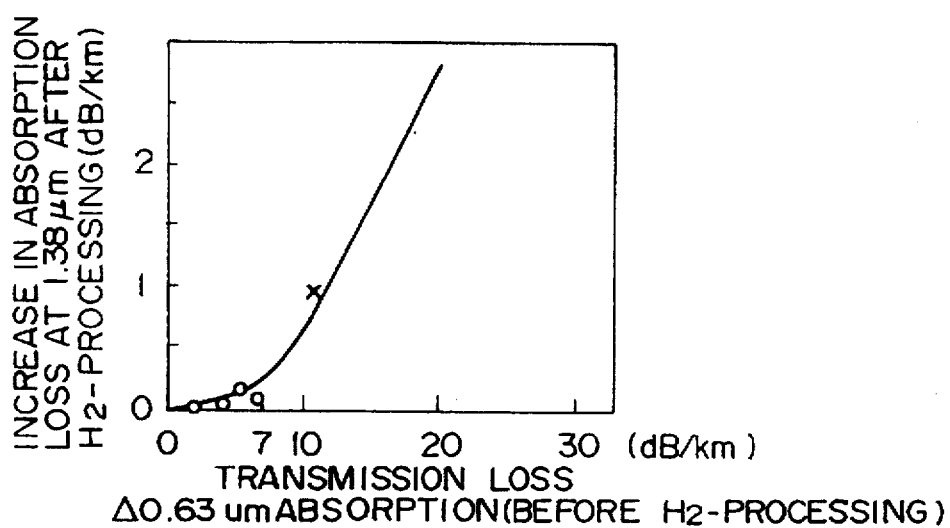
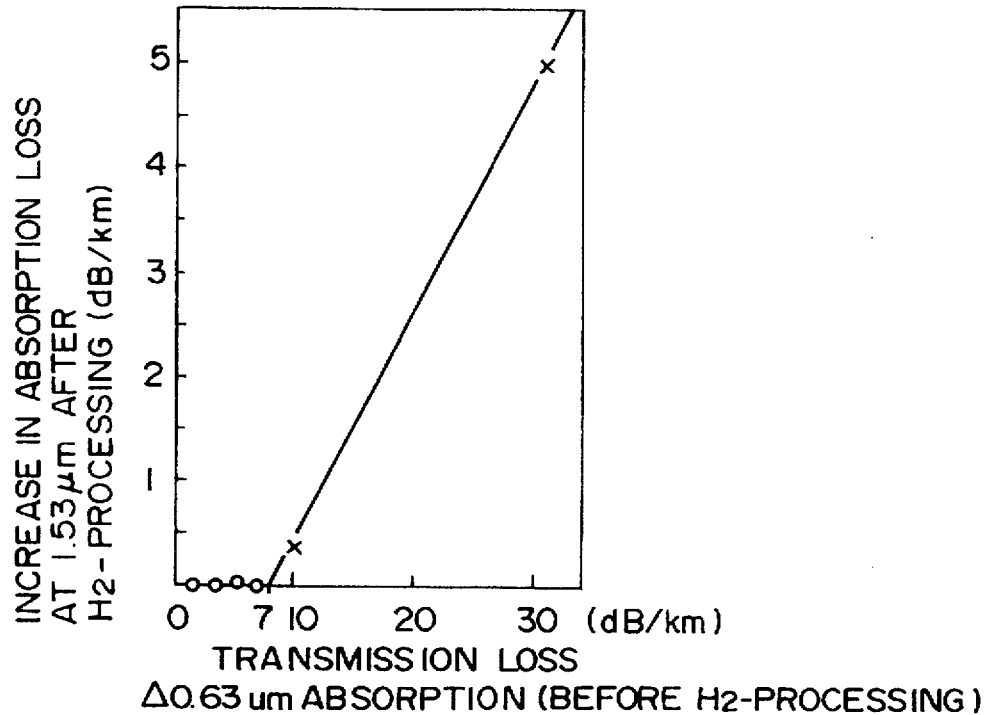

GLASS BODY FOR OPTICAL FIBER METHOD OF SELECTING THE SAME OPTICAL FIBER AND METHOD OF MAKING THEREOF

BACKGROUND OF THE INVENTION

1. Field of the Invention

The present invention relates to a composite glass body for optical fiber and an optical fiber using the same and, in particular, to a composite glass body (including a matrix for optical fiber and its intermediates) using $GeO_2$—$SiO_2$ glass as its core portion, a method of selecting such a glass body for optical fiber, an optical fiber formed by drawn optical fiber matrix comprising such a glass body, and a method of making the optical fiber.

2. Related Background Art

In *The Transactions of the Institute of Electronics, Information and Communication Engineers*, C–I, vol. J72-C-I, No. 1, pp. 45–52 (1989), it is described that, when absorption at a wavelength of 0.63 µm (non-bridging oxygen hole center, referred to as "NBOHC" hereinafter, i.e., $\equiv Si—O^{19}$) exists in a silica glass type optical fiber comprising $GeO_2$—$SiO_2$ glass as its core, hydrogen diffuses into the optical fiber, thereby increasing absorption loss at 1.38 µm (Si—OH) and 1.53 µm (attributable to several sources according to different theories).

This publication discloses that the absorption at 0.63 µm (Si—O·) is generated due to the fact that alkali elements in the glass diffuse into the fiber at a drawing step, thereby forming a bond ($\equiv Si—O—Na^+$) which becomes a source of defect absorption, and that the absorption is formed as a glass network is severed upon high tension and high drawing rate at the time of drawing.

Such an optical fiber with a large absorption at a wavelength band of 0.63 µm has been disadvantageous in that, when hydrogen diffuses into the glass, it yields a large increase in absorption at 1.38 µm and 1.53 µm, thereby adversely affecting transmission loss at communication wavelength bands of 1.3 µm and 1.55 µm.

Currently, optical fibers are manufactured such that impurities such as alkali and transition metal are decreased as much as possible while their drawing condition is selected so as to suppress the absorption at 0.63 µm as much as possible. Nevertheless, due to the instability in glass structure caused by addition of $GeO_2$ thereto, the absorption at 0.63 µm of the optical fiber comprising $GeO_2$—$SiO_2$ glass as its core cannot have been sufficiently suppressed as compared with an optical fiber whose core is made of pure silica glass.

The present invention is made in order to overcome such a problem, and the object thereof is to provide a composite glass body and optical fiber which can sufficiently suppress absorption at 0.63 µm.

SUMMARY OF THE INVENTION

As a result of detailed analysis of bulk gas and optical fiber, the inventors have found that the amount of absorption at 0.63 µm depends not only on the drawing condition but also on the manufacturing condition of the glass body for optical fiber; that, in a composite glass body for optical fiber comprising $GeO_2$—$SiO_2$ as its core, absorbance of the $GeO_2$—$SiO_2$ glass at 5.16 eV (wavelength at 0.240 µm) and absorption at 0.63 µm correlate with each other; and that, when this absorbance is suppressed to an appropriate range, the absorption at 0.63 µm can be reduced to an amount which does not influence the communication wavelength band.

The present invention provides a glass body for optical fiber containing $GeO_2$—$SiO_2$ glass in a core portion thereof, wherein the $GeO_2$—$SiO_2$ glass has an absorbance increment at 5.16 eV of at least 1/mm but not higher than 2.5/mm. The present invention also provides an optical fiber which is made when a matrix for optical fiber comprising this glass body for optical fiber is melt and drawn.

Also, the present invention provides a glass body for optical fiber containing $GeO_2$—$SiO_2$ glass in a core portion thereof, wherein concentration of $Ge^{2+}$ contained in the $GeO_2$—$SiO_2$ glass substantially lies within the range of $1.1 \times 10^{-9}$ to $2.8 \times 10^{-9}$ mol/mm³ as calculated by the following general equation:

$$A = \epsilon_{5.16ev} \cdot C_{(Ge2+)} \cdot l$$

wherein A is absorbance which is expressed by $A = -\log T$ (T being transmittance) and normalized per 1 mm of optical path length, $C_{(Ge2+)}$ is $Ge^{2+}$ concentration, $\epsilon_{5.16ev}$ is absorption coefficient (1/mol/cm), and l is optical path length. The present invention also provides an optical fiber which is made when a matrix for optical fiber comprising this glass body for optical fiber is melt-drawn.

Further, the present invention provides a method of selecting a matrix for optical fiber containing $GeO_2$–$SiO_2$ glass in a core portion thereof, which method comprises the steps of selecting, before manufacturing an optical fiber containing $GeO_2$—$SiO_2$ glass in a core portion thereof, a glass body in which the $GeO_2$—$SiO_2$ glass has an absorbance increment at 5.16 eV of at least 1/mm but not higher than 2.5/mm or in which concentration of $Ge^{2+}$ contained in the glass substantially lies within the range of $1.1 \times 10^{-9}$ to $2.8 \times 10^{-9}$ mol/mm³ as calculated by the following general equation:

$$A = \epsilon_{5.16ev} \cdot C_{(Ge2+)} \cdot l$$

wherein A is absorbance which is expressed by $A = -\log T$ (T being transmittance) and normalized per 1 mm of optical path length, $C_{(Ge2+)}$ is $Ge^{2+}$ concentration, $\epsilon_{5.16ev}$ is absorption coefficient (1/mol/cm), and l is optical path length; and using thus selected glass body as a matrix for forming the optical fiber by melt-drawning.

Further, the present invention provides a glass body for optical fiber containing fluorine-containing $GeO_2$—$SiO_2$ glass in a core portion thereof, wherein the fluorine-containing $GeO_2$—$SiO_2$ glass has an absorbance increment at 5.16 eV of at least 1/mm but not higher than 2.5/mm. The present invention also provides an optical fiber which is made when a matrix for optical fiber comprising this glass body for optical fiber is melt-drawn.

Also, the present invention provides a glass body for optical fiber containing fluorine-containing $GeO_2$—$SiO_2$ glass in a core portion thereof, wherein concentration of $Ge^{2+}$ contained in the fluorine-containing $GeO_2$—$SiO_2$ glass substantially lies within the range of $1.1 \times 10^{-9}$ to $2.8 \times 10^{-9}$ mol/mm³ as calculated by the following general equation:

$$A = \epsilon_{5.16ev} \cdot C_{(Ge2+)} \cdot l$$

wherein A is absorbance which is expressed by $A = -\log T$ (T being transmittance) and normalized per 1 mm of optical path length, $C_{(Ge2+)}$ is $Ge^{2+}$ concentration, $\epsilon_{5.16ev}$ is absorption coefficient (1/mol/cm), and l is optical path length. The present invention also provides an optical fiber which is made when a matrix for optical fiber comprising this glass body for optical fiber is melt-drawn.

Further, the present invention provides a method of selecting a matrix for optical fiber containing fluorine-containing $GeO_2$—$SiO_2$ glass in a core portion thereof, which method comprises the steps of selecting, before manufacturing an optical fiber containing fluorine-containing $GeO_2$—$SiO_2$ glass in a core portion thereof, a glass body in which the fluorine-containing $GeO_2$—$SiO_2$ glass has an absorbance increment at 5.16 eV of at least 1/mm but not higher than 2.5/mm or in which concentration of $Ge^{2+}$ contained in the glass substantially lies within the range of $1.1\times10^{-9}$ to $2.8\times10^{-9}$ mol/mm$^3$ as calculated by the following general equation:

$$A = \epsilon_{5.16ev} \cdot C_{(Ge2+)} \cdot l$$

wherein A is absorbance which is expressed by A=-log T (T being transmittance) and normalized per 1 mm of optical path length, $C_{(Ge2+)}$ is $Ge^{2+}$ concentration, $\epsilon_{5.16ev}$ is absorption coefficient (1/mol/cm), and l is optical path length; and using thus selected glass body as a matrix for forming the optical fiber by melt-drawning.

Also, the present invention provides a method of making an optical fiber comprising the steps of melting a matrix for optical fiber comprising the foregoing glass body for optical fiber in accordance with the present invention in an inert gas atmosphere, e.g. nitrogen gas, under a condition where the temperature within the furnace is about 2100° C.; and then melt-drawning thus melt glass body at an drawning rate of 100 to 2,000 m/min. so as to yield an optical fiber.

Here, "glass body for optical fiber" in the present invention encompasses not only the matrix for optical fiber used in the drawing step but also so-called intermediates which are forms in the manufacturing step for making the matrix.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3 is a chart showing a relationship between Δ absorption at 0.63 μm and increase in loss at 1.38 μm after hydrogen processing;

FIG. 4 is a chart showing a relationship between Δ absorption at 0.63 μm and increase in loss at 1.53 μm after hydrogen processing;

DESCRIPTION OF THE PREFERRED EMBODIMENTS

Figure 1:
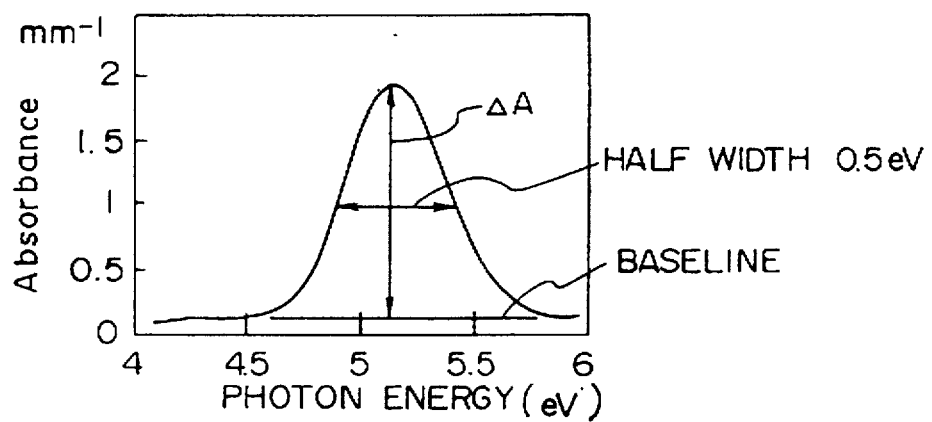
FIG. 1 is a chart showing an absorption peak at 5.16 eV (wavelength of 0.240 μm)

FIG. 1 is a graph showing an absorption peak (with a half-width of 0.5×ΔA (eV)) at 5.16 eV (wavelength of 0.240

μm) which the inventors have taken account of. Here, absorbance A is expressed by A=-log T (T being transmittance) and normalized per 1 mm of optical path length. Also, difference ΔA from a baseline on the graph is defined as absorbance increment and assumed to be within the range of at least 1/mm but not higher than 2.5/mm.

The inventors have attributed the peak at 5.16 eV to $Ge^{2+}$ since the half-width of the peak substantially coincides with the center wavelength of $Ge^{2+}$ disclosed in Table II of H. Hosono et al., *Physical Review*, B, vol. 46, No. 18 (1992), pp. 11445–11451. This publication is incorporated herein by reference.

Figure 2:
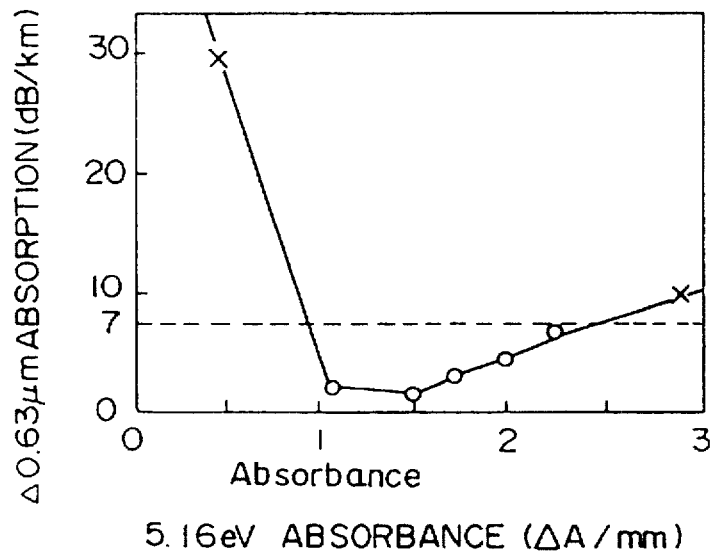
FIG. 2 is a chart showing a relationship between absorption at 5.16 eV and Δ absorption at 0.63 μm.

Absorption at 5.16 eV in a $GeO_2$—$SiO_2$ glass body was measured, an optical fiber comprising this glass body as its core was prepared, Δ absorption at 0.63 μm of this optical fiber was measured, both of these absorption data were plotted on a graph, and their correlation was investigated. FIG. 2 shows the result thereof. As in the case of absorption at 5.16 eV, Δ absorption at 0.63 μm is analyzed as a difference from the baseline. FIGS. 3 and 4 show relationships between Δ absorption at 0.63 μm before hydrogen processing and increases in absorption loss at 1.38 μm and 1.53 μm after the hydrogen processing, respectively. Here, the hydrogen processing of optical fibers was effected for one week at room temperature in an atmosphere of 1% $H_2$.

For each of $GeO_2$—$SiO_2$ glass and fluorine-containing $GeO_2$—$SiO_2$ glass bodies, the absorption at 5.16 eV thereof was measured as follows. Namely, the glass body was cut into a thickness of 1 mm, its cutting plane was polished into a mirror surface, and absorption spectrum in the core portion of the resulting sample was measured by a normal ultraviolet/visible spectrophotometer.

After an optical fiber comprising one of $GeO_2$—$SiO_2$ glass and fluorine-containing $GeO_2$—$SiO_2$ glass bodies as its core was prepared, its Δ absorption at 0.63 μm was measured as explained in the following.

Figures 7A, 7B:
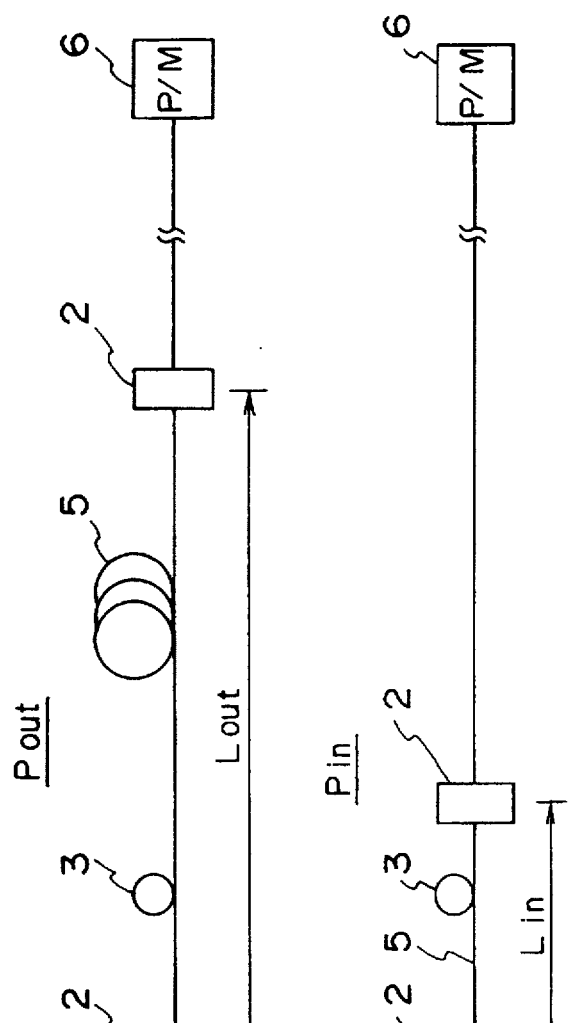
FIGS. 7A and 7B are schematic views showing an apparatus for measuring Δ absorption at 0.63 μm.

As shown in FIGS. 7A and 7B, within a range defined by V-shaped grooves 2, transmittance of light from a light source 1 through an optical fiber 5 is measured by a powder meter 6 wherein reference number 3 indicates a turn around a mandrel and reference number 4 indicates a single mode fiber, and then Δ absorption at 0.63 μm is computed from the following equation:

$$(P_{out}-P_{in})/\text{sample length [dB/km]}$$

wherein $P_{out}$ is transmittance of light through the sample 5 to be measured when its length $L_{out}$=300 m, whereas $P_{in}$ is transmittance of light through the sample 5 when its length $L_{in}$=1 m. The range of light measured is 500 to 800 nm, with a measurement pitch of 10 nm. As the light source 1, a xenon (Xe) lamp was used.

From the results shown in FIGS. 3 and 4, the inventors have clarified that Δ absorption at 0.63 μm has a threshold near 7 dB/km and that, at this threshold or higher value, the absorption at 1.38 μm increases while absorption loss at 1.53 μm is generated. Further, the inventors have found out from FIG. 2 that, in order to suppress Δ absorption at 0.63 μm to 7 dB/km or less, it is appropriate for the absorbance increment at 5.16 eV to be set at 1 to 2.5/mm.

From these facts, the inventors have found out that, when $GeO_2$—$SiO_2$ glass which lies within this range is used to prepare a matrix for optical fiber and is then drawn to form an optical fiber, absorption losses at 1.38 μm and at 1.53 μm can be suppressed, whereby an optical fiber which is excellent in hydrogen resistance can be obtained.

Also, with respect to fluorine-containing $GeO_2$—$SiO_2$ glass, the inventors have found out that, when glass (F—GeO$_2$—SiO$_2$) whose absorbance increment at 5.16 eV is 1 to 2.5/mm is used to prepare a matrix for optical fiber and then drawn to form an optical fiber, absorption losses at 1.38 µm and at 1.53 µm can be suppressed, whereby an optical fiber which is excellent in hydrogen resistance can be obtained.

Mechanisms by which absorption at 0.63 µm is generated and thus generated absorption at 0.63 µm (☐Si—O˙) becomes absorptions at 1.38 µm and 1.53 µm upon hydrogen processing are considered by the inventors as follows.

Figure 5:
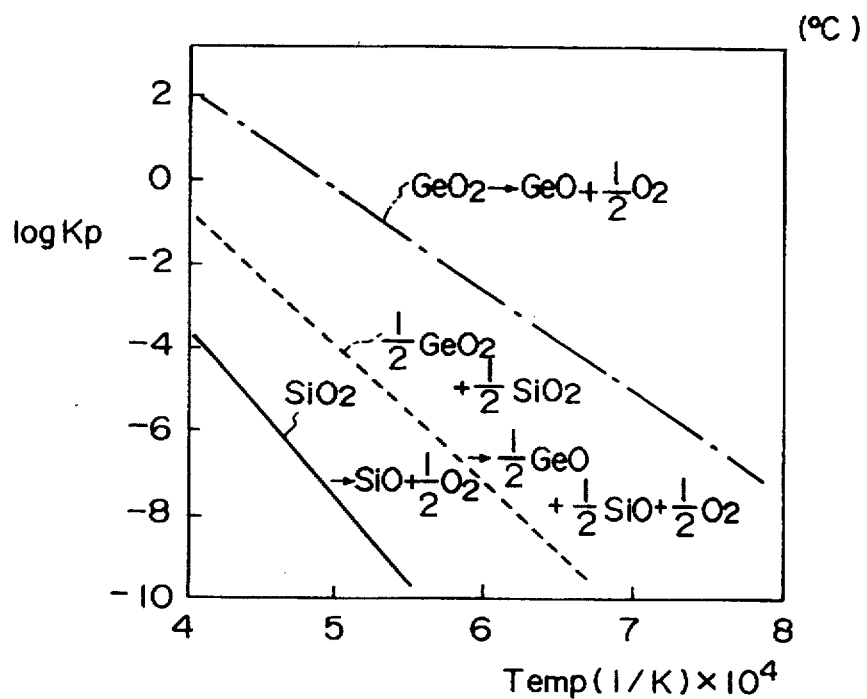
FIG. 5 is a chart showing temperature dependency of equilibrium constant in each chemical reaction.

FIG. 5 shows temperature dependencies of equilibrium constants in the following three decomposition reactions (1) to (3):

(1) GeO$_2$→GeO+½O$_2$
(2) ½GeO$_2$+½SiO$_2$→½GeO+½SiO+½O$_2$
(3) SiO$_2$→SiO+½O$_2$

From FIG. 5, it is presumed that decomposition reaction for GeO$_2$ is most likely to occur and that, in a low-concentration reaction such as that of glass defects, the decomposition reaction occurs at a temperature of about 1,000° C.

Change of GeO$_2$ into GeO is equivalent to reduction of Ge$^{4+}$ into Ge$^{2+}$. Absorption at 5.16 eV is considered to capture thus reduced Ge$^{2+}$ (GeO).

Figure 6:
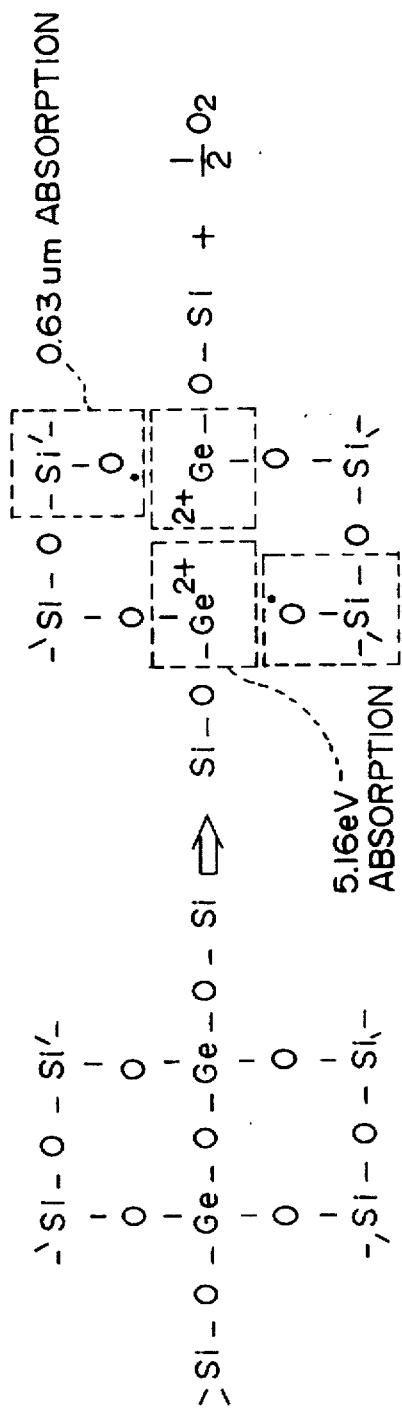
FIG. 6 is a model chart for explaining causes of absorption at 5.16 eV.

When studied from the viewpoint of glass structure, this phenomenon is represented by a model shown in FIG. 6. Upon the reaction shown in FIG. 6, ≡Si—O˙ is generated together with Ge$^{2+}$. Also, it is considered that oxygen is released, and thus released free oxygen chemically combines with other kinds of defects (≡Si˙, i.e., E' center, and ≡Ge—Si≡ or ≡Si—Si≡, i.e., oxygen-vacancy, which generates E' center when released) present in the glass, thereby newly generating ≡Si—O˙.

Accordingly, it is presumed that, even in the case where Ge concentration is constant, excess oxygen becomes greater as the number of Ge$^{2+}$ defects is larger.

When F (fluorine) is added to GeO$_2$—SiO$_2$ glass, ≡Si˙ (E' center) or oxygen-vacancy such as ≡Ge—Si≡ or ≡Si—Si≡ reacts with F to form Si—F, thereby effectively suppressing the generation of ≡Si—O˙ by free oxygen.

Further, when hydrogen diffuses into glass, the generated NBOHC reacts with hydrogen to form Si—OH (see the following equation).

≡Si—O˙+½H$_2$→Si—OH (absorption at 1.38 µm)

Also, when the binding energy of Si—O and that of Ge—O are compared with each other, the former is 400 KJ/mol whereas the latter is 330 KJ/mol. Accordingly, Si—O exists more stably.

At the drawing step where temperature becomes higher than that in the heat treatment step for fine particles of glass where the fine particles are subject to a temperature of 1,000° to 1,600° C., the glass matrix is subjected to a high temperature of 2,000° to 2,200° C. Accordingly, under a drawing condition which yields high tension and high drawing rate, Ge—O bond in ≡Ge—O—Si≡ linkage is cut off. Since Ge$^{2+}$ in Ge is stable, as the bond is cut off, glass defects of ≡Ge$^{2+}$, ≡Si—O˙, and

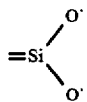

are consequently generated.

As Mentioned above, ≡Si—O˙ is a defect of NBOHC and reacts with hydrogen to generate Si—OH, thereby increasing absorption loss at 1.38 µm. On the other hand, the defect of

seems to react with hydrogen to form an intramolecular hydrogen bond, thereby generating absorption at 1.53 µm.

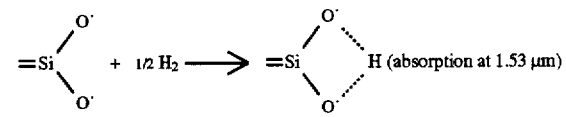

This intramolecular hydrogen bond has an absorption at 3,400 to 3,200 cm$^{-1}$ which is attributable to a harmonic of 1.53 µm.

Here, when the relationship between absorbance A and Ge$^{2+}$ concentration is determined with reference to the disclosure in a publication (H. Hosono et al., "Nature and Origin of the 5-eV Band in SiO$_2$:GeO$_2$ Glasses," *Physical Review*, vol. 46, No. 118, pp. 11445–11451), the following equation is obtained:

$$A = \epsilon_{5.16eV} \cdot C_{(Ge2+)} \cdot 1$$

wherein $\epsilon_{5.16eV}$ is absorption coefficient (1/mol/cm), $C_{(Ge2+)}$ is Ge$^{2+}$ concentration, and 1 is optical path length. Assuming that $\epsilon_{5.16eV}=9\times10^3$ (using the above-mentioned publication, p. 11449, left column, lines 6 to 7) and 1=1 mm (measurement condition), Ge$^{2+}$ is determined as Ge$^{2+}$=A/$\epsilon_{5.16eV}$/1.

As a result of calculations using the values listed above, the Ge$^{2+}$ concentration corresponding to absorbance A=1 to 2.5/mm$^{-1}$ becomes $1.1\times10^{-9}$ to $2.8\times10^{-9}$ mol/mm$^3$. The above-mentioned publication is incorporated herein by reference.

As explained in the foregoing, the inventors have clarified that the absorption defect (≡Si—O˙) at 0.63 µm is closely related to the absorber at 5.16 eV. When glass manufacturing conditions (deposition condition for fine particles of glass, sintering condition, etc) are optimized so as to control the absorbance increment at 5.16 eV as defined in the claimed glass bodies for optical fiber and optical fibers, generation of glass defects can be decreased so as to sufficiently suppress the absorption at 0.63 µm.

Thus, in accordance with the present invention, a glass body for manufacturing an optical fiber which is excellent in hydrogen resistance and has less glass defects can be selected. Also, without evaluation of absorption loss on the shorter wavelength side as an optical fiber, its hydrogen characteristic can be estimated in the glass state. Accordingly, absorption loss can be evaluated easily and efficiently.

A preferable method of making an optical fiber in accordance with the present invention uses, as a matrix for the optical fiber, GeO$_2$—SiO$_2$ glass whose absorbance increment at 5.16 eV is at least 1/mm but not higher than 2.5/mm or GeO$_2$—SiO$_2$ glass in which concentration of Ge$^{2+}$ contained therein is $1.1\times10^{-9}$ to $2.8\times10^{-9}$ mol/mm$^3$. When this matrix is introduced into a melting furnace and melted therein in an inert gas atmosphere under a condition where the temperature within the furnace is 2,000° to 2,200° C., and then thus melt glass body is melt-drawn at a drawning rate of 100 to 2,000 m/min., an optical fiber can be obtained.

The concentration of $Ge^{2+}$ contained in $GeO_2$—$SiO_2$ glass is substantially calculated by the above-mentioned general equation and lies within the range of $1.1\times10^{-9}$ to $2.8\times10^{-9}$ mol/mm$^3$.

EXAMPLE 1

$GeO_2$—$SiO_2$ glass whose absorbance increment at 5.16 eV was 1.7/mm, as a matrix for optical fiber, was melt in a melting furnace in an inert gas atmosphere under a condition where the temperature within the furnace was about 2,000° C., and then thus melt glass body was melt-drawn at a drawning rate of about 200 m/min., whereby an optical fiber having a core diameter of about 8.5 μm was obtained.

EXAMPLE 2

$GeO_2$—$SiO_2$ glass in which concentration of $Ge^{2+}$ contained therein was $1.89\times10^{-9}$ mol/mm$^3$., as a matrix for optical fiber, was melt in a melting furnace in an inert gas atmosphere under a condition where the temperature within the furnace was about 2,100° C., and then thus melt glass body was melt-drawn at a drawning rate of about 500 m/min., whereby an optical fiber having a core diameter of about 8.5 μm was obtained.

Here, the concentration of $Ge^{2+}$ contained in the $GeO_2$—$SiO_2$ glass was computed according to the following general equation:

$$A = \epsilon_{5.16ev} \cdot C_{(Ge2+)} \cdot l$$

wherein A is absorbance which is expressed by $A=-\log T$ (T being transmittance) and normalized per 1 mm of optical path length, $C_{(Ge2+)}$ is $Ge^{2+}$ concentration, $\epsilon_{5.16ev}$ is absorption coefficient (1/mol/cm), and l is optical path length.

EXAMPLE 3

Fluorine-containing $GeO_2$—$SiO_2$ glass whose absorbance increment at 5.16 eV was 1.5/mm was used as a matrix for optical fiber, and under a condition identical to that of Example 1, an optical fiber having a core diameter of about 8.5 μm was obtained.

EXAMPLE 4

Fluorine-containing $GeO_2$—$SiO_2$ glass in which concentration of $Ge^{2+}$ contained therein was $1.67\times10^{-9}$ mol/mm$^3$ was used as a matrix for optical fiber, and under a condition identical to that of Example 2, an optical fiber having a core diameter of 8.59 μm was obtained.

Here, the concentration of $Ge^{2+}$ contained in the fluorine-containing $GeO_2$—$SiO_2$ glass was computed according to the general equation used in Example 2.

As shown in FIG. 2, it was confirmed that increase in peaks of transmission loss at an absorption band of 0.63 μm was suppressed in the optical fibers obtained in Examples 1 to 4.

Comparative Example 1

$GeO_2$—$SiO_2$ glass whose absorbance increment at 5.16 eV was 0.5/mm was used as a matrix for optical fiber, and under a condition identical to that of Example 1, an optical fiber having a core diameter of 8.5 μm was obtained.

Comparative Example 2

$GeO_2$—$SiO_2$ glass in which concentration of $Ge^{2+}$ contained therein was $0.56\times10^{-9}$ mol/mm$^3$ was used as a matrix for optical fiber, and under a condition identical to that of Example 2, an optical fiber having a core diameter of 8.5 μm was obtained.

Here, the concentration of $Ge^{2+}$ contained in the $GeO_2$—$SiO_2$ glass was computed according to the general equation used in Example 2.

Comparative Example 3

Fluorine-containing $GeO_2$—$SiO_2$ glass whose absorbance increment at 5.16 eV was 2.8/mm was used as a matrix for optical fiber, and under a condition identical to that of Example 1, an optical fiber having a core diameter of 8.5 μm was obtained.

Comparative Example 4

Fluorine-containing $GeO_2$—$SiO_2$ glass in which concentration of $Ge^{2+}$ contained therein was $3.11\times10^{-9}$ mol/mm$^3$ was used as a matrix for optical fiber, and under a condition identical to that of Example 2, an optical fiber having a core diameter of 8.5 μm was obtained.

Here, the concentration of $Ge^{2+}$ contained in the fluorine-containing $GeO_2$—$SiO_2$ glass was computed according to the general equation used in Example 2.

As shown in FIG. 2, increase in peaks of transmission loss at an absorption band of 0.63 μm was not suppressed in the optical fibers obtained in Comparative Examples 1 to 4.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A glass body for the manufacture of an optical fiber, containing fluorine-containing $GeO_2$—$SiO_2$ glass in a core portion of said body, wherein said fluorine-containing $GeO_2$—$SiO_2$ glass has an absorbance increment at 5.16 eV of at least 1/mm but not higher than 2.5/mm.

2. A method of selecting a matrix for forming an optical fiber, containing fluorine-containing $GeO_2$—$SiO_2$ glass in a core portion, said method comprising the steps of selecting, a glass body in which said $GeO_2$—$SiO_2$ glass has an absorbance increment at 5.16 eV of at least 1/mm but not higher than 2.5/mm; and using the selected glass body as a matrix from which the optical fiber is formed by melt-drawing.

3. A method of making an optical fiber comprising the steps of:

selecting the matrix according to claim 2, melting said matrix in an inert gas atmosphere under a condition where the temperature within the furnace is about 2,000° to 2,200° C.; and then melt-drawing the melted matrix at a drawing rate of 100 to 2,000 m/min. so as to yield an optical fiber.

4. An optical fiber made by a process according to claim 3.

5. A glass body for the manufacture of an optical fiber, containing: fluorine-containing $GeO_2$—$SiO_2$ glass in a core portion of said body, said fluorine-containing $GeO_2$—$SiO_2$ glass containing $Ge^{2+}$ with a concentration which lies substantially within a range of $1.1\times10^{-9}$ to $2.8\times10^{-9}$ mol/mm$^3$.

6. A glass body according to claim 5, said fluorine-containing $GeO_2$—$SiO_2$ glass containing $Ge^{2+}$ with a concentration which lies substantially within a range of 1.1×

$10^{-9}$ to $2.8\times10^{-9}$ mol/mm³ mol/mm³ as calculated by the following general equation:

$$A=\epsilon_{5.16ev}C_{(Ge2+)}\cdot l$$

wherein A is absorbance which is expressed by $A=-\log T$ (T being transmittance) and normalized per 1 mm of optical path length, $C_{(Ge2+)}$ is $Ge^{2+}$ concentration, $\epsilon_{5.16ev}$ is the absorption coefficient (1/mol/cm), and l is the optical path length.

7. A method of selecting a matrix, for forming an optical fiber, containing fluorine-containing $GeO_2$—$SiO_2$ glass in a core portion, said method comprising the steps of selecting, a glass body in which the concentration of $Ge^{2+}$ contained in said glass lies substantially within a range of $1.1\times10^{-9}$ to $2.8\times10^{-9}$ mol/mm³ as calculated by the following general equation:

$$A=\epsilon_{5.16ev}C_{(Ge2+)}\cdot l$$

wherein A is absorbance which is expressed by $A=-\log T$ (T being transmittance) and normalized per 1 mm of optical path length, $C_{(Ge2+)}$ is $Ge^{2+}$ concentration, $\epsilon_{5.16ev}$ is the absorption coefficient (1/mol/cm), and l is the optical path length; and using the selected glass body as a matrix from which the optical fiber is formed by melt-drawing.

8. A method of making an optical fiber comprising the steps of:

selecting a matrix according to claim 7, melting the matrix in an inert atmosphere under a condition where the temperature within the furnace is about 2,000° to 2,200° C.; and then melt-drawing the melted matrix at a drawing rate of 100 to 2,000 m/min. so as to yield an optical fiber.

9. An optical fiber made by a process according to claim 8.

* * * * *